United States Patent
Barykin et al.

(10) Patent No.: US 9,128,968 B2
(45) Date of Patent: Sep. 8, 2015

(54) SYSTEMS AND METHODS FOR DATA COMPRESSION

(71) Applicant: Facebook, Inc., Menlo Park, CA (US)

(72) Inventors: Oleksandr Barykin, Sunnyvale, CA (US); Josh Metzler, Redwood Shores, CA (US)

(73) Assignee: Facebook, Inc., Menlo Park, CA (US)

( * ) Notice: Subject to any disclaimer, the term of this patent is extended or adjusted under 35 U.S.C. 154(b) by 286 days.

(21) Appl. No.: 13/951,433

(22) Filed: Jul. 25, 2013

(65) Prior Publication Data

US 2015/0032757 A1    Jan. 29, 2015

(51) Int. Cl.
*G06F 17/30* (2006.01)

(52) U.S. Cl.
CPC ................ *G06F 17/30321* (2013.01)

(58) Field of Classification Search
None
See application file for complete search history.

(56) References Cited

U.S. PATENT DOCUMENTS

| | | | |
|---|---|---|---|
| 2002/0123994 A1* | 9/2002 | Schabes et al. | 707/5 |
| 2010/0146112 A1* | 6/2010 | Shacham et al. | 709/224 |
| 2011/0219360 A1* | 9/2011 | Srinivasa et al. | 717/124 |

* cited by examiner

*Primary Examiner* — Wilson Lee
(74) *Attorney, Agent, or Firm* — Sheppard Mullin Richter & Hampton LLP

(57) ABSTRACT

Event data comprising an unordered string set may be received. String set dictionary indexes may be assigned for strings of the unordered string set in a string set dictionary. The unordered string set may be sorted to provide a sorted series based on the string set dictionary indexes for the unordered string set. A differential series may be computed from the sorted series. The differential series may be encoded into binary code words. In an embodiment, the event data also may comprise strings. A schema version associated with the strings in a row may be determined. Computing resources may be allocated based on the schema version.

20 Claims, 11 Drawing Sheets

SYSTEMS AND METHODS FOR DATA COMPRESSION

TECHNICAL FIELD

The technical field relates to the field of social networking systems. More particularly, the technical field relates data management techniques in social networking systems.

BACKGROUND

Social networks have revolutionized electronic communications by providing users with interactive ways to communicate and connect with one another. Social networks have allowed users to exchange electronic messages, share images and video, and indicate relationships with each other. Social networks have also created online message boards and communities where users can interact with each other. Due to the popularity of these and other features, a significant portion of humanity maintains membership in some form of social network.

Even routine usage of social networks may involve creation of large volumes of data. More specifically, users of a social network may generate data related to how various segments of the social network are performing, data related to trends in content generated or accessed by users, behavioral data about users of the social network, and other data. Given the extensive amount of data, efficiently monitoring and managing the data in a social network may prove a difficult task for administrators. For example, quality assurance teams and product development teams may find it difficult to quickly and reliably search the data maintained by a social network.

SUMMARY

Systems, methods, and computer storage media may receive event data comprising an unordered string set. String set dictionary indexes may be assigned for strings of the unordered string set in a string set dictionary. The unordered string set may be sorted to provide a sorted series based on the string set dictionary indexes for the unordered string set. A differential series may be computed from the sorted series. The differential series may be encoded into binary code words.

In some embodiments, the binary code words may be stored to a leaf node of an in-memory data storage module. The string set dictionary may be stored to the leaf node. The binary code words may be decompressed.

In some embodiments, the sorted series may comprise an ascending series. The binary code words may comprise Fibonacci code words representing the differential series. The unordered string set may represent user experiment group information or error report information of a social networking system.

In some embodiments, the unordered string set may be part of a row being ingested into a portion of an in-memory data storage module. The portion may comprise a leaf node or an aggregator of the in-memory data storage module.

In some embodiments, the event data may comprise strings. A schema version for a row index associated with the strings may be determined. Resources may be allocated based on the schema version.

In some embodiments, the strings may be organized by columns.

In some embodiments, a string dictionary may be associated with each column. A string dictionary index may be assigned to a unique string in a column.

In some embodiments, the string dictionary may be written to a leaf node of an in-memory data storage module.

In some embodiments, determination of the schema version may comprise creating a row index based on string dictionary indexes for the strings a row and assigning the schema version based on the row index. Creation of the row index may comprise creating a string dictionary index for each unique string and assigning the row index based on the string dictionary index for each unique string.

In some embodiments, event data may correspond to one or more of a performance event on a computing system, user interaction with the computing system, or a behavioral event on the computing system.

In some embodiments, the system may be incorporated into a social networking system.

Many other features and embodiments are apparent from the accompanying drawings and from the following detailed description.

Figure 1:
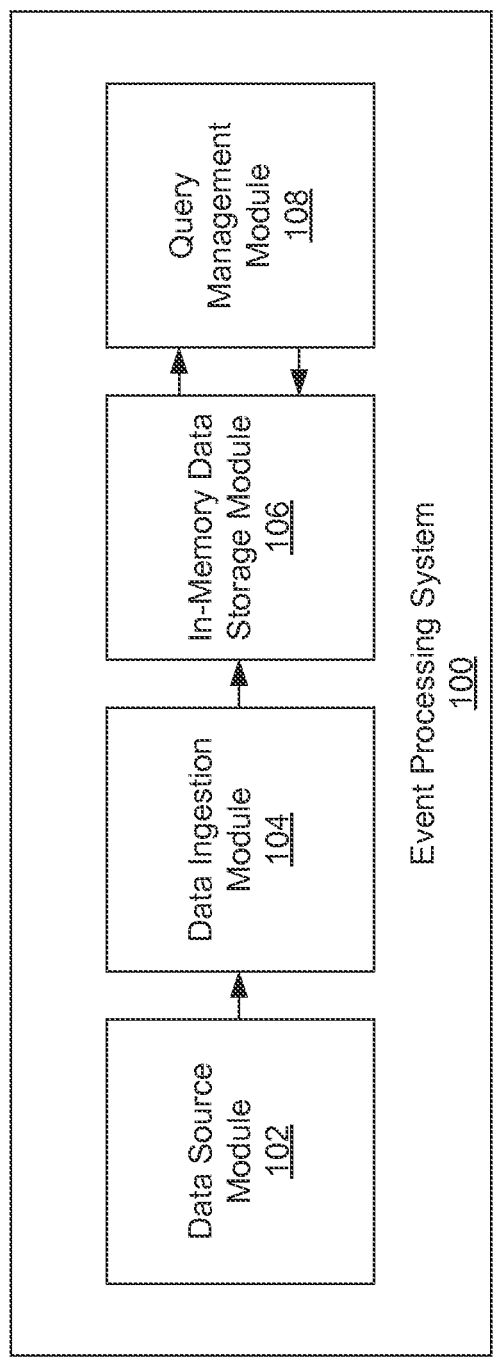
FIG. 1 shows an example of an event processing system, in accordance with some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles described herein.

DETAILED DESCRIPTION

Data Compression

A social networking system may include a complex web of interdependent subsystems. Problems in any of these subsystems may cause issues that can propagate through the social networking system. As an example, problems in a web server may cause problems elsewhere in the social networking system. To help operators identify problems and monitor the state of the social networking system, persistent event processing systems may be employed. The persistent event processing systems may use hard-drives to store event logs of events that occur on the social networking system. Operators seeking to understand the events may query the hard-drives for information, such as performance or user interaction metrics, that are likely linked to the events. Only after evaluating the information on the hard-drives may operators conduct an informed analysis of the event.

However, the process of writing to and querying hard-drives may take hours or even days. Operators may not have access to information about events soon after the events occur. As a result, social networking systems with persistent event processing systems may not have sufficiently low latency to ensure effective operation. Social networking systems with persistent event processing systems also may not provide sufficiently responsive tools for operators. That is, operators may not be able to evaluate the behavior of users of a social networking system or user interactions with the social networking system in a timely manner.

Such evaluation can performed for myriad reasons. For example, a feature, such a graphical search feature or a user interface feature, may be turned on for one set of users constituting an experiment group of a social networking system, but not others. It may be desirable to model how users of the experiment group are interacting with the feature to improve user experience. As another example, it may be desirable to efficiently parse error reports for site reliability purposes. Users may provide commonly used words in error reports (e.g., "chat," "does," "friend," "not," "load," etc.) that suggest where a social networking system may be experiencing sub-optimal performance. As yet another example, it may be desirable to perform content analysis of content generated by users.

FIG. 1 shows an example of an event processing system 100, in accordance with some embodiments. The event processing system 100 may include a data source module 102, a data ingestion module 104, an in-memory data storage module 106, and a query management module 108. The components in this figure and all figures herein are exemplary only, and may be variously replaced by, combined with, or integrated into other similar components. The event processing system 100 may provide information about events that are occurring on a social networking system. Events processed by the event processing system 100 may include performance events of the social networking system. Performance events may include how hardware or software of the social networking system is performing. More specifically, performance events may include metrics such as processing load, numbers of cache requests, network throughput, time required by a server to generate a page, or any other metrics. Rapidly providing information about performance events may prove relevant for members of quality assurance teams, such as site performance teams, who may monitor and attempt to optimize hardware or software performance of the social networking system. Examples of performance events may also include error reports related to problems in one or more of the modules that make up the social networking system.

Events processed by the event processing system 100 may also include user events, such as different types of user interaction with the social networking system. Examples of user events may include information about data trends, words in users' posts, surges in word frequencies, demographic information (e.g., users' countries, ages, genders, etc.) of users posting content to the social networking system, etc.

As another example, the event processing system 100 may provide information about behavioral events on the social networking system. Behavioral events may include information relating to how different users of a social networking system respond to changes in a web or mobile platform associated with the social networking system. Examples of behavioral events include information about usage patterns, such as user locations or ages, product parameters (e.g., devices, operating systems, etc.), or keywords in error reports. Examples of behavioral events may further include usage of a mobile application associated with the social networking system, interactions of users of the social networking system with advertisements, interactions of users with a new page or feature provided by the social networking system, or any other activity that may be influenced by a change to the social networking system. The event processing system 100 may also provide information about arbitrary data on the social networking system. Arbitrary data may include any data an operator of the social networking system is interested in obtaining.

In some embodiments, rapidly providing information about events may prove invaluable to product development engineers or performance evaluation personnel who may be interested in understanding user interaction with information in the social networking system. Rapidly providing information about events may also prove relevant for product development managers or performance evaluation personnel who may want to evaluate responses of different users of the social networking system to changes on a website or mobile application associated with the social networking system.

The data source module 102 may capture data relating to an event on the social networking system. The data source module 102 may include web servers, backend server systems, or data imported from persistent data storage systems. The data source module 102 may also include devices that allow users of a social networking system to access portions of web servers or backend server systems.

In an embodiment, the data source module 102 may provide log entries that represent events. Each log entry may be based on one or more logging calls implemented in the data source module 102. Each log entry may have a standard format for ingestion by the data ingestion module 104. In various embodiments, each log entry may include at least one field that provides a unique identifier for the log entry. In some embodiments, a timestamp, such as a Unix timestamp, may serve as the unique identifier of each log entry provided by the data source module 102. Use of a timestamp to uniquely identify log entries may allow the data source module 102 and the other modules of the event processing system 100 to efficiently capture information about time-varying phenomena.

A log entry from the data source module 102 may have a standardized data format to describe events occurring in the social networking system. In an embodiment, the standardized data format may include an integer field, a string field, a string set field that contains unordered strings, and a string vector field that contains ordered sets of strings. The integer field may include information used for aggregations, comparisons, groupings, and other purposes. In some embodiments, the integer field may include a timestamp of an event. In various embodiments, a timestamp portion of a log entry, such as a UNIX timestamp, in the integer field may be required for the log entry to be considered by the event processing system 100. As a result, the timestamp portion may be taken as an index of a given row of data represented by the data source module 102. It is noted that use of the timestamp field to identify log entries may be particularly advantageous to identify and analyze time-varying phenomena.

The string field of the standardized data format may include character strings. The string field may include information for performing comparisons, groupings of text, and other purposes. In some embodiments, the string field may be broken into subfields. More specifically, the string field may be broken into a common string field and a unique string field.

The common string field may be used to represent strings that there are likely to be multiple instances of in a social networking system. In some embodiments, the common string field may represent, for example, parameters such as fetch parameters, cluster parameters, location parameters, and page parameters of a social networking system. The unique string field may be used to represent strings that there are not likely to be multiple instances of in the social networking system.

The string set field of the standardized data format may include unordered sets of strings. As just one example, the string set field may include information for representing words in a post on a social networking system. As just another example, the string set field may also include information for representing sets of features (e.g., a graph search, a news feed redesign, etc.) that are true for a given user of the social networking system. The string set field may also represent sets of stings that are likely to have a sufficiently low cardinality to be efficiently grouped together. In some embodiments, the string set field may represent unordered sets of strings, such as tag sets in a social networking system. In some embodiments, the string set field may represent users in a user experiment group. The string set field may also represent commonly used language in error reports or commonly provided content by users. The string set field may represent other types of information relating to a social networking system.

The string vector field of the standardized data format may include ordered sets of character strings. For example, the string vector field may include information for performing stack traces in the social networking system. In an embodiment, the order of data in the string vector field may correspond to a level of a stack trace in the social networking system.

In an embodiment, the standardized data format may comprise a table. The first column of the table may include integer fields that are populated with the UNIX timestamp of events being logged in the social networking system. The remaining columns of the table may include populated integer fields, string fields, string set fields, and string vector fields. Each of the populated fields may be indexed by the UNIX timestamp of the first column of the table. Each row of the table may describe an event on a social networking system.

It is noted that the standardized data format may support other types of fields without departing from the scope and substance of the inventive concepts described herein. It is also noted that the standardized data format need not support various data types, such as floating numbers, that may take large amounts of memory to store. In some embodiments, other data types, such as floating number types, may be represented as one of the fields of the standardized data format. For instance, the integer field may be used to represent other data types, such as floating number types.

The data ingestion module 104 may ingest data from the data source module 102, and store the data in the in-memory data storage module 106. In some embodiments, the data ingestion module 104 may write the log entries to the in-memory data storage module 106 as the log entries are received from the data source module 102. The data ingestion module 104 may also convert log entries from the data source module 102 to a format compatible with the datastores of the in-memory data storage module 106. For instance, in some embodiments, the data ingestion module 104 may serialize log entries from the data source module 102. The serialized log entries may be stored in the in-memory data storage module 106.

The data ingestion module 104 may compress the log entries for storage in the in-memory data storage module 106. In some embodiments, compression techniques of the data ingestion module 104 may be adapted to data having the standardized data format. For example, the data ingestion module 104 may compress integer fields of data having the standardized data format using variable-length compression techniques. The data ingestion module 104 may also compress string fields, string set fields, and string vector fields of data having the standardized data format using dictionary compression techniques. FIG. 2, FIG. 3, FIG. 4, and FIG. 5 further address the compression techniques of the data ingestion module 104.

The in-memory data storage module 106 may include in-memory data storage units that store event data relating to events captured by the data source module 102. In-memory data storage units may include logical units that are dedicated to providing dynamic memory, such as random access memory (RAM), for storing data. The in-memory data storage units may be implemented by a hierarchical structure that facilitates rapid queries of stored data. For instance, the in-memory data storage module 106 may include a tree with leaf nodes to store the event data in an unaggregated state. In an embodiment, the leaf nodes may store a compressed representation of the event data that was received from the data ingestion module 104. The tree in the in-memory data storage module 106 may further include aggregator nodes that query the leaf nodes for the event data. The aggregator nodes of the in-memory data storage module 106 may also aggregate data that is received as a result of queries to the leaf nodes. Though the discussion herein refers to "leaf nodes," those of ordinary skill in the art will appreciate that the inventive concepts described herein may apply to in-memory data storage units that are implemented in a non-hierarchical manner.

In some embodiments, the in-memory data storage module 106 may be implemented by one or more clusters of computers configured to provide dynamic memory for storage. In an embodiment, the in-memory data storage module 106 may include several hundred servers each having 144 Gigabytes (GB) of RAM dedicated to storing data relating to the events captured by the data source module 102.

The in-memory data storage module 106 may clear the leaf nodes periodically. For instance, the in-memory data storage module 106 may delete data stored for a specified prior period, e.g., a month, in its storage units. As a result, in some embodiments, the in-memory data storage module 106 may provide an easily accessible snapshot of recent events captured by the data source module 102.

Figure 6:
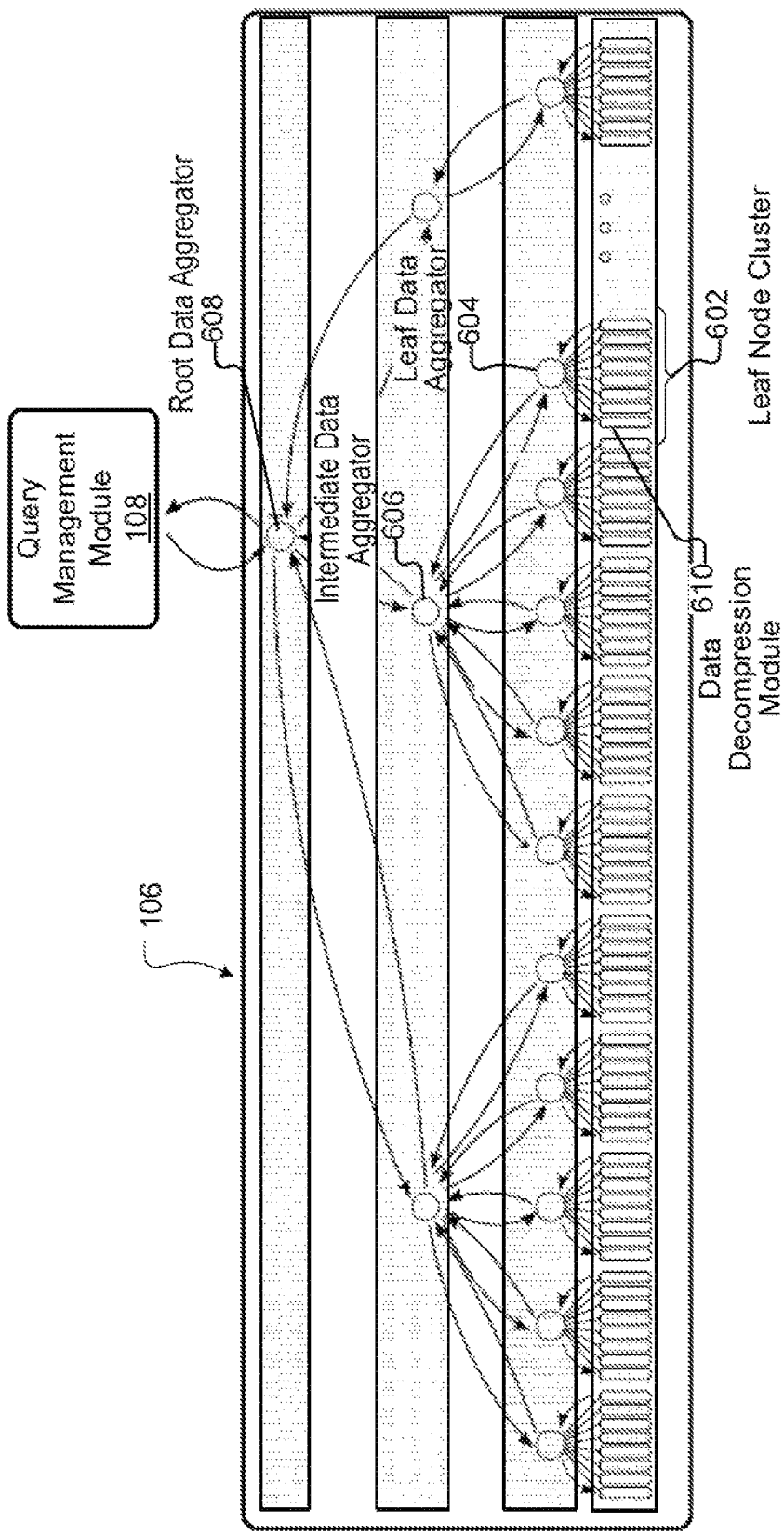
FIG. 6 shows an example of an in-memory data storage module, in accordance with some embodiments.

In some embodiments, the in-memory data storage module 106 may decompress data in the leaf nodes. The decompression techniques may vary depending on the data type. As a result, the in-memory data storage module 106 may use different decompression techniques for integer fields, string fields, string set fields, and string vector fields. FIG. 6 further shows the in-memory data storage module 106.

The query management module 108 may query the in-memory data storage module 106 for data stored in leaf nodes. More specifically, the query management module 108 may support one or more interfaces that allow users to obtain data stored in the in-memory data storage module 106. The query management module 108 may also support various application programming interfaces (APIs), including web-based APIs, SQL interfaces, and/or other interfaces. The query management module 108 may further support a hierarchical aggregation model of event data in the in-memory data storage module 106. That is, the query management module 108 may provide instructions to aggregator nodes in the in-memory data storage module 106 to aggregate data from the leaf nodes of the in-memory data storage module 106 in a hierarchical manner.

Figure 2:
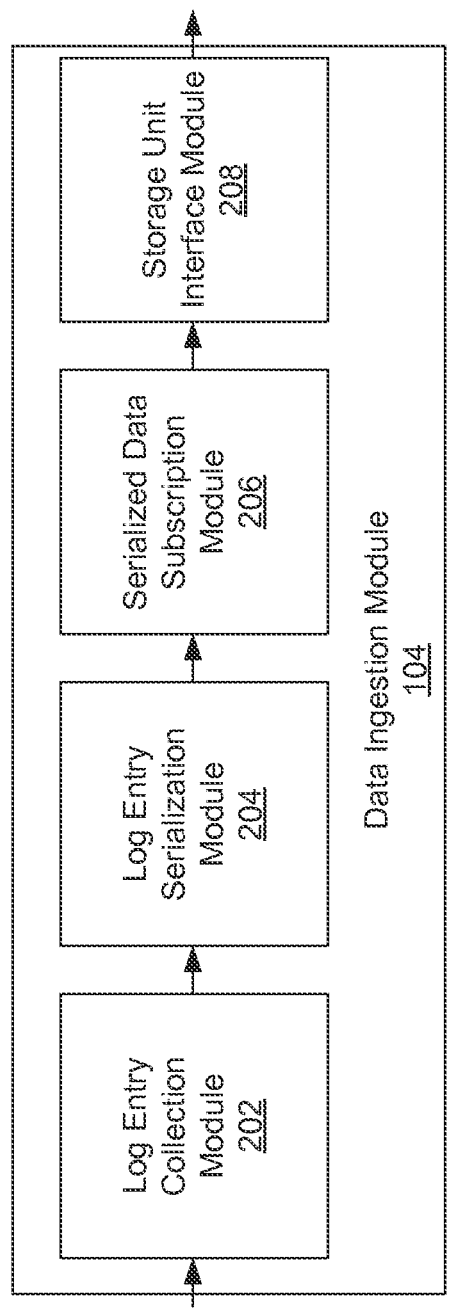
FIG. 2 shows an example of a data ingestion module, in accordance with some embodiments.

FIG. 2 shows an example of a data ingestion module 104, in accordance with some embodiments. The data ingestion module 104 may comprise a log entry collection module 202, a log entry serialization module 204, a serialized data subscription module 206, and a storage unit interface module 208. The data ingestion module 104 may ingest data from the data source module 102 for storage in the in-memory data storage module 106. As discussed herein, the data ingestion module 104 may rapidly ingest log entries of events in a social networking system. The data ingestion module 104 may also rapidly write the log entries to the in-memory data storage module 106.

The log entry collection module 202 may collect log entries from the data source module 102. In an embodiment, the log entry collection module 202 may be implemented as scribeh computer clusters having Scribe servers running on Hadoop clusters. In this regard, the Scribe servers may aggregate logs coming from different web servers and write them as HDFS files in the associated Hadoop cluster. Collecting log entries may involve sampling the data provided by the data source module 102. For instance, in some embodiments, the log entry collection module 202 may collect only a fraction of the data from the data source module 102. As discussed herein, the sampling may later be compensated for when stored data is aggregated after a query.

In an embodiment, the log entry collection module 202 may collect a table of events logged from a social networking system as the events occur on the social networking system. The log entries from the data source module 102 may have a standardized data format that describes events occurring on a social networking system. As a result, in some embodiments, the log entry collection module 202 may receive a table of log entries indexed by the UNIX timestamp of the events represented by the log entries. Each log entry may have its remaining fields populated with information about a particular event occurring on the social networking system. In this example, the log entry collection module 202 may collect rows of the table as the rows are generated. Each row may describe an event occurring on the social networking system.

The log entry serialization module 204 may serialize the log entries received from the log entry collection module 202. In some embodiments, the log entry serialization module 204 may convert the log entries from a standardized data format (e.g., a table that represents events on a social networking system) into a format that can be stored in the in-memory data storage module 106. For instance, the log entry serialization module 204 may convert the log entries from the standardized data format into a serial array (e.g., an array having a JavaScript Object Notation (JSON) format) that can be stored in the in-memory data storage module 106. In an embodiment, the log entry serialization module 204 may provide serialized log entries to the serialized data subscription module 206. The serialized log entries may include a set of log lines that describe the information in the table provided by the log entry collection module 202.

The serialized data subscription module 206 may determine categories of log entries that are relevant for storage in the in-memory data storage module 106. The serialized data subscription module 206 may also subscribe to relevant categories of log entries. Log entries having categories deemed relevant by the serialized data subscription module 206 may be provided to the storage unit interface module 208. In some embodiments, the serialized data subscription module 206 may implement one or more tailer processes to provide portions of the serialized log entries to the storage unit interface module 208. In some embodiments, the format of the data from the serialized data subscription module 206 to the storage unit interface module 208 may include a dynamic JSON (dJSON) format.

The storage unit interface module 208 may divide the serialized log entries into distributed chunks that are stored in leaf nodes of the in-memory data storage module 106. The size of the distributed chunks may be chosen to optimize storage in the leaf nodes. For instance, the storage unit interface module 208 may divide serialized log entries containing 100,000 log lines into fifty distributed chunks, each having 2,000 log lines. In various embodiments, the distributed chunks may be compatible with Thrift protocols.

Figure 3:
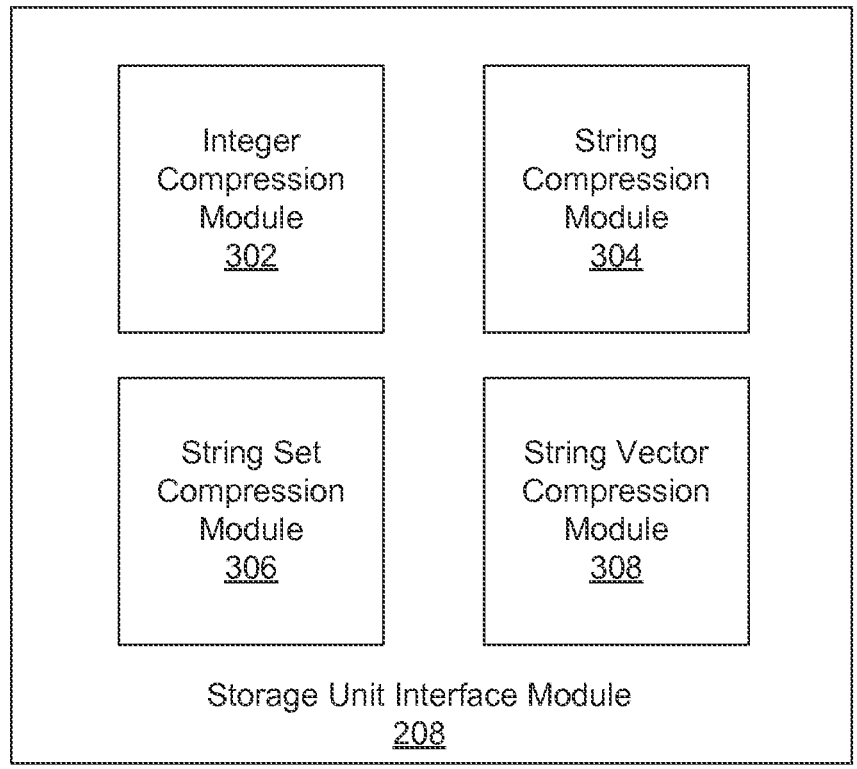
FIG. 3 shows an example of a storage unit interface module, in accordance with some embodiments.

In some embodiments, the storage unit interface module 208 may compress data for storage in the in-memory data storage module 106. The compression techniques may be adapted to compress data having the standardized data format. For example, the storage unit interface module 208 may compress integer fields of data having the standardized data format with variable-length compression techniques. The storage unit interface module 208 may also compress other fields of data having the standardized data format (e.g., string fields, string set field, string vector fields, etc.) with dictionary compression techniques. FIG. 3 shows the storage unit interface module 208 in greater detail.

In some embodiments, the storage unit interface module 208 may compress the data before it divides the serialized log lines into the distributed chunks, while in other embodiments, compression may occur after the serial log lines have been divided into the distributed chunks. Further, although the discussion herein refers to compression techniques performed by the storage unit interface module 208, it is noted that compression could be performed by other modules of the data ingestion module 104, such as the log entry collection module 202, the log entry serialization module 204, or the serialized data subscription module 206.

The storage unit interface module 208 may store the distributed chunks of the serialized log entries in leaf nodes of the in-memory data storage module 106. The storage unit interface module 208 may also optimize storage of the distributed chunks in the leaf nodes. In an embodiment, the storage unit interface module 208 may select a plurality of leaf nodes at random. The storage unit interface module 208 may determine which of the plurality of leaf nodes has more storage capacity than the other selected leaf nodes. The storage unit interface module 208 may then store the distributed chunks in the leaf node that has more storage capacity. As a result, the storage unit interface module 208 may end up striping the rows of table in the log entries randomly across all of the leaf nodes in the in-memory data storage module 106. The resulting distribution across the leaf nodes of the in-memory data storage module 106 may provide a fast and flexible way to store log entries.

In some embodiments, the storage unit interface module 208 may manage a plurality of processing threads. For instance, the storage unit interface module 208 may create a separate processing thread for each distributed chunk being stored in a leaf node of the in-memory data storage module 106. Each time a distributed chunk is to be written to the leaf node of the in-memory data storage module 106, the storage unit interface module 208 may create a separate thread. The storage unit interface module 208 may also delete the threads as write operations are finished.

FIG. 3 shows an example of the storage unit interface module 208, in accordance with some embodiments. The storage unit interface module 208 may include an integer compression module 302, a string compression module 304, a string set compression module 306, and a string vector compression module 308. As discussed herein, the storage unit interface module 208 may compress event data so that the event data can be efficiently stored in the in-memory data storage module 106.

The integer compression module 302 may compress integers into binary code words. In an embodiment, the integer compression module 302 may compress integer fields of event data into bits. The bits may represent the contents of the integer fields in binary form. The bits may be of variable-length or of fixed length. Examples of variable-length compression techniques that the integer compression module 302 may use include Huffman coding techniques, Lempel-Ziv coding techniques, arithmetic coding techniques, etc. The integer compression module 302 may provide the binary code words to the in-memory data storage module 106.

The string compression module 304 may compress strings using a string dictionary that is provided to the in-memory data storage module 106. The string dictionary may represent rows of event data organized in columns. Each column may be associated with a string dictionary. The string dictionary may contain one listing of each unique string residing in a column of event data. A string dictionary index may include a value that reflects how many times each string appears in the column. A row index of the string dictionary may include the string dictionary index values for each row of event data. The string compression module 304 may assign a schema version to each row index. The schema version may correspond to the maximum number of bits required to store the row index. In some embodiments, the string compression module 304 may compress common strings but need not compress unique strings. Columns may be stored compressed or uncompressed, depending on how many distinct values of strings are in the columns.

The string set compression module 306 may compress string sets using a string set dictionary. The string set dictionary may contain a listing of string set elements in a string set residing in the string set fields of event data. The string set dictionary may also contain a string set dictionary index that indicates where each listed string set element resides in the string set. In some embodiments, string set elements may be associated with values that indicate where the string set elements reside in a string set. As an example, the first string set element of a string set may correspond to a "−1" or a "0," depending on encoding convention or requirements. Subsequent string set elements may correspond to subsequent values. The string set dictionary index for a row may represent the differences in values of string set elements in a row after the string set elements for the row have been sorted by value. In some embodiments, the string set compression module 306 may perform binary encoding (e.g., Fibonacci encoding) of the differences.

The string vector compression module 308 may compress string vectors using a string vector dictionary. The string vector dictionary may contain a listing of unique strings of the string vector fields of event data. The string vector dictionary may also contain a string vector index that indicates the order of the unique strings within a particular string vector. The string vector compression module 308 may provide the string vector dictionary to the in-memory data storage module 106.

Figure 4:
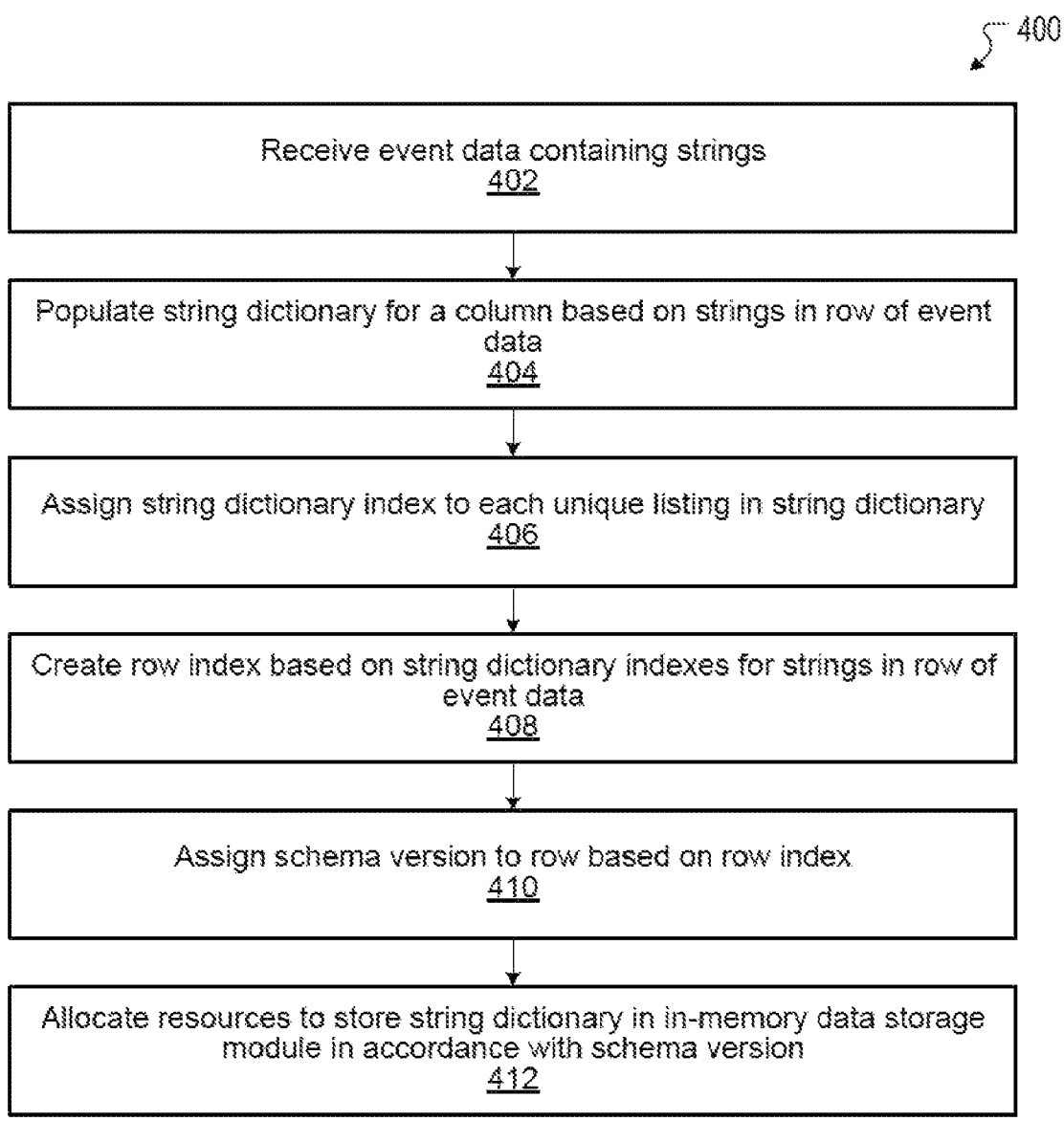
FIG. 4 shows an example of a process for compressing strings, in accordance with some embodiments.

FIG. 4 shows an example of a process 400 for compressing strings, in accordance with some embodiments. The process 400 is shown in conjunction with the string compression module 304, shown in FIG. 3.

At block 402, the string compression module 304 may receive event data containing strings. In various embodiments, the string compression module 304 may receive serialized log entries including strings in event data. The event data may comprise rows. The row may be organized in columns. The strings in the row may be relevant to performance events, user events, behavioral events, or other events on the social networking system. In some embodiments, the string compression module 304 may receive a plurality of rows of event data as portions of a table that represents events on a social networking system. As an example, the string compression module 304 may receive a first row with the strings [a, b, c, d], a second row with the strings [a, c, c, d], and a third row with the strings [a, d, b, c].

At block 404, the string compression module 304 may populate a string dictionary for a column based on the strings in the rows of event data. In some embodiments, the string compression module 304 may list a string in the string dictionary if the string is not in the string dictionary. To facilitate compression, the string compression module 304 need not add a second time strings that are already in the string dictionary. In some embodiments, the string compression module 304 may populate the string dictionary on a per-column basis with each column associated with its own string dictionary. That is, the string compression module 304 may only add a string to the string dictionary for a column if the string has not already been represented in the column.

At block 406, the string compression module 304 may assign a string dictionary index to each unique listing in the string dictionary. The string dictionary index may comprise a numerical value such as an integer. The string dictionary index may represent how recently the listing was written into the string dictionary. For instance, listings that were first written to the string dictionary may have a lower number, while listings that were more recently written to the string dictionary may have a higher number. For instance, if a string is not in the string dictionary, the string compression module 304 may add a listing for the string, and may assign a string dictionary index of 0. If a string is already listed once in the string dictionary, the string compression module 304 may simply assign the second instance of the specific string a string dictionary index of 0.

In an embodiment, the string compression module 304 may assign the string dictionary index on a per-column basis. That is, the string compression module 304 may assign the string dictionary index based on when a string first appears in a particular column of event data. Presented above was an example with a first row with the strings [a, b, c, d], a second row with the strings [a, c, c, d], and a third row with the strings [a, d, b, c]). In this example, the string compression module 304 may assign a value of 0 for: all occurrences of the string "a" in the first column, occurrence of the string "b" in the second column, occurrences of the string "c" in the third column, and occurrences of the string "d" in the fourth column. This may be because "a," "b," "c," and "d" are the first strings in the first through the fourth columns, respectively. Because they appear second in their respective columns, the string dictionary may provide a value of 1 for: the string "c" in the second column, the string "b" in the third column, and the string "c" in the fourth column. In this example, the string dictionary may provide a value of 2 for the string "d" in the second column.

At block 408, the string compression module 304 may create a row index based on the string dictionary indexes for the strings in the row of event data. More specifically, the string compression module 304 may represent the row of event data as a sequence of string dictionary indexes that provide the placement of each unique string in the row. To continue the foregoing example, the first row of the event data (i.e., the first row with the strings [a, b, c, d]) may be represented by a row index of [0, 0, 0, 0]. The second row of the event data (i.e., the second row with the strings [a, c, c, d]) may be represented by a row index of [0, 1, 0, 0]. The third row of the event data (i.e., the third row with the strings [a, d, b, c]) may be represented by a row index of [0, 2, 1, 1].

At block 410, the string compression module 304 may assign a schema version to the row based on the row index of the row. The schema version may include the maximum number of bits required by the string dictionary to store each row index. To continue the foregoing example, a schema version for the first row of the event data (i.e., the first row with the strings [a, b, c, d]) may include the number of bits needed to represent the row index [0, 0, 0, 0]. A schema version for the second row of event data (i.e., the second row with the strings [a, c, c, d]) may comprise the number of bits needed to represent the row index [0, 1, 0, 0]. A schema version for the third row of event data (i.e., the third row with the strings [a, d, b, c]) may comprise the number of bits needed to represent the row index [0, 2, 1, 1]. In some embodiments, the string compression module 304 may provide the schema version to the leaf nodes of the in-memory data storage module 106.

At block 412, the string compression module 304 may allocate resources to store the string dictionary, including row indexes, in the in-memory data storage module 106 in accordance with the schema version. In some embodiments, the string compression module 304 may allocate the bits that are required to store the schema version of the string dictionary. By assigning the schema version, the string compression module 304 may allow the string dictionary to be efficiently compressed into the leaf nodes of the in-memory data storage module 106. For example, assignment of the schema version may allow leaf nodes to allocate only the number of bits that are required to store a row index. To continue the foregoing example, the row index of the first row of the event data may consume less memory than the row index of the third row of the event data. By providing the schema version to the leaf nodes, the string compression module 304 may indicate this fact. In response, the leaf nodes may allocate less memory to store the first row index than the third row index.

Figure 5:
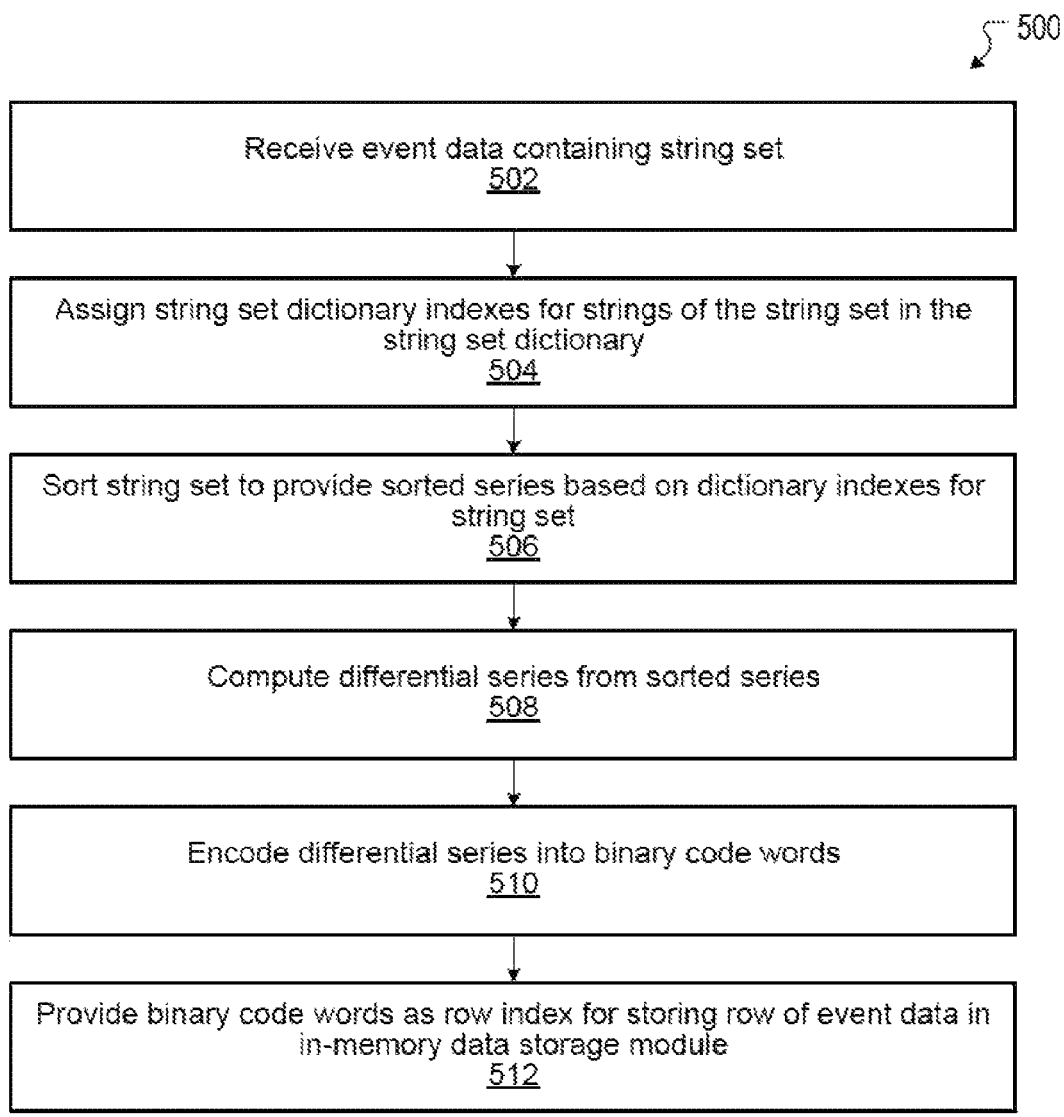
FIG. 5 shows an example of a process for compressing string sets, in accordance with some embodiments.

FIG. 5 shows an example of a process for compressing string sets, in accordance with some embodiments. The process 500 is shown in conjunction with the string set compression module 306, shown in FIG. 3.

At block 502, the string set compression module 306 may receive event data containing a string set. In some embodiments, the string set compression module 306 may receive a row of event data. The string set compression module 306 may also receive serialized log entries that represent a row of string set fields in event data. The row of event data may represent performance events, user events, behavioral events, or other events on a social networking system. As an example, the row of event data may represent the names of users of the social networking system. An example of a row of event data may include the names [Sarah, John, Bob, Mike, Susan].

At block 504, the string set compression module 306 may assign string set dictionary indexes for strings of the string set in the string set dictionary. In some embodiments, the string set compression module 306 may obtain the string set dictionary indexes from an existing string set dictionary that represents the string set. For instance, the string set compression module 306 may obtain string set dictionary indexes for string sets that represent performance events, user events, behavioral events, or other events on a social networking system. In some embodiments, the string set compression module 306 may create a new string set dictionary or may add to an existing string set dictionary. The string set dictionary index may comprise a numerical value such as an integer. In an embodiment, the string set dictionary index may represent how recently the unordered string was written to the string set dictionary. For instance, unordered strings that were first written to the string set dictionary may have a lower number, while unordered strings that were more recently written to the string set dictionary may have a higher number.

To continue the prior example, the row containing the names [Sarah, John, Bob, Mike, Susan] may correspond to a string set of a particular group of users of the social networking system. The string set compression module 306 may gather the string set dictionary indexes of the unordered string "Sarah," "John," "Bob," "Mike," and "Susan" in the relevant string set dictionary. String set dictionary indexes of 14, 2, 8, 1, and 3 may be retrieved for these strings, respectively. The string set compression module 306 may provide values of [14, 2, 8, 1, 3] for the row containing the unordered strings [Sarah, John, Bob, Mike, Susan].

At block 506, the string set compression module 306 may sort the string set to provide a sorted series based on the string set dictionary indexes for the string set. In some embodiments, the string set compression module 306 may sort the integers representing the unordered strings so that the unordered strings are in ascending order. As the strings in the string set are unordered, the sort need not cause any loss of data. As a result, the string set compression module 306 may produce a sorted series of unordered strings in a row. The sorted series may be ranked by the string dictionary index of those strings. To further continue the prior example, the string set compression module 306 may sort the row containing the unordered strings [Sarah, John, Bob, Mike, Susan] in an ascending manner, that is, to provide the sorted series [1, 2, 3, 8, 14]. Though the foregoing examples discuss an ascending sort, it is noted that a descending sort, or other sort, may be performed without departing from the scope and substance of the inventive concepts described herein.

At block 508, the string set compression module 306 may compute a differential series from the sorted series. In some embodiments, the string set compression module 306 may take the difference of consecutive value pairs of the sorted series. In some embodiments, the string set compression module 306 may provide a differential series that includes the differences of consecutive value pairs of the sorted series. To continue the prior example, the string set compression module 306 may provide the differential series of [2, 1, 1, 5, 6] for the row containing the unordered strings [Sarah, John, Bob, Mike, Susan], given a starting value of −1.

At block 510, the string set compression module 306 may encode the differential series into binary code words. In some embodiments, the binary code words may comprise a Fibonacci representation of the differences. To continue the foregoing example, a binary code representation of the row containing the unordered strings [Sarah, John, Bob, Mike, Susan] based on a Fibonacci representation may be as follows: 01111110001110011. In the foregoing example, the string set compression module 306 may only have to store the binary code for the value "6" rather than the binary code for the value "14," which may result in more efficient use of dynamic memory. Also, as the numerical sequence "11" occurs only at the end of each code word, the Fibonacci encoding techniques may allow for encoding the differences of the consecutive elements of the sorted list in a manner that facilitates efficient storage and parsing. At block 512, the string set compression module 306 may provide the binary code words as a row index for storing the row of event data in the in-memory data storage module 106.

FIG. 6 shows an example of an in-memory data storage module 106, in accordance with some embodiments. The in-memory data storage module 106 may include a leaf node cluster 602, a leaf data aggregator 604, an intermediate data aggregator 606, a root data aggregator 608, and a data decompression module 610.

The leaf node cluster 602 may include a cluster of leaf nodes dedicated to providing dynamic memory for storing data. The leaf nodes of the leaf node cluster 602 may share a specific region, a specific configuration, a specific set of computer systems, etc. The leaf nodes of the leaf node cluster 602 need not use a hard-drive or other persistent storage as their primary storage device. Rather, the leaf nodes of the leaf node cluster 602 may store data in their dynamic memory. The leaf nodes of the leaf node cluster 602 may comprise a memory server with a large amount of RAM configured to store the data.

The leaf nodes of the leaf node cluster 602 may also store distributed chunks that represent serialized log entries. In an embodiment, storing the distributed chunks may involve storing on persistent storage a compressed copy (e.g., a gzip copy) of the batch file for back-up purposes. Storing the distributed chunks may further involve reading the distributed chunks for new rows of information, compressing each column of the distributed chunks, and adding the information from the new rows into dynamic memory. In some embodiments, the leaf nodes of the leaf node cluster 602 may receive the data to be stored in a compressed format. More specifically, data arriving at the leaf nodes of the leaf node cluster 602 may have the standardized data format. In such data, the integer fields may have been compressed using variable-length compression techniques. Other fields of the data (e.g., string fields, string set field, string vector fields, etc.) may have been compressed using dictionary compression techniques. In this example, the leaf nodes may have portions dedicated to storing parts of the standardized data format. For instance, the leaf nodes of the leaf node cluster 602 may include integer memory blocks to store compressed integers, string memory blocks to store string dictionaries of strings, string set memory blocks to store string set dictionaries of string sets, and string vector memory blocks to store string vector dictionaries of string vectors.

In some embodiments, an event occurring on a social networking system may be represented in the leaf nodes of the leaf node cluster 602 within a short time (e.g., minutes) after the event occurred. The leaf nodes of the leaf node cluster 602 may also provide the distributed chunks of the serialized log entries to the leaf data aggregator 604 in response to queries for particular types of the distributed chunks of serialized log entries.

In some embodiments, the leaf nodes of the leaf node cluster 602 may optimize memory management by expiring stored data. Data may be expired based on one or more criteria, including an age criterion or a space criterion. More specifically, the leaf nodes of the leaf node cluster 602 may expire data that, based on the timestamp of the data, is determined to be too old for storage in the leaf node cluster 602. In an embodiment, the leaf nodes of the leaf node cluster 602 may expire data that is older than thirty days. The leaf nodes of the leaf node cluster 602 may also expire data that has exceeded space limits of the leaf nodes. In an embodiment, the leaf nodes of the leaf node cluster 602 may expire data that is larger than 100 GB. The leaf nodes of the leaf node cluster 602 may expire the data at specified intervals (e.g., every fifteen minutes).

The leaf nodes of the leaf node cluster 602 may impose special limits for particular types of events. For instance, in some embodiments, the leaf nodes of the leaf node cluster 602 may impose higher space limits for high volume tables. An example of a high volume table may include a table that provides network traffic in a social networking system. Another example of a high volume table may include a table that provides revenue-generating data like ad clicks, impressions, and the like.

The leaf nodes of the leaf node cluster 602 may also allow for subsampling of stored data in order to store some types of data longer than space limits allow. For instance, the leaf nodes of the leaf node cluster 602 may only keep a uniform fraction of rows older than a certain age. The leaf nodes of the leaf node cluster 602 may also implement other forms of sampling, such as stratified sampling, that allows for the leaf nodes to choose a more representative set of rows to keep for extended periods of time.

The leaf nodes of the leaf node cluster 602 may process queries for stored data. Each leaf node may return all stored data that complies with a time range of a query. In some embodiments, each leaf node need not aggregate the results of the query, and may instead allow leaf data aggregators, intermediate data aggregators, and root data aggregators to perform aggregations. The leaf node cluster 602 may also optimize searching of character strings by maintaining a per-query cache of results matching regular expressions. The per-query cache may be indexed by dictionary values of the string.

The leaf data aggregator 604 may receive queries for data stored in the leaf nodes of the leaf node cluster 602. In some embodiments, executing a query for distributed data may comprise searching the dynamic memory of the leaf nodes of the leaf node cluster 602 for the presence of particular data structures. For example, the leaf data aggregator 604 may search the dynamic memory of the leaf nodes of the leaf node cluster 602 for the presence of particular integers, particular strings, particular unordered sets of strings, and particular ordered vectors of strings. In an embodiment, the leaf data aggregator 604 may provide the queries to the leaf nodes of the leaf node cluster 602 in parallel. In response to these queries, one or more of the nodes of the leaf node cluster 602 may provide distributed chunks of the serialized log entries having the information requested in the query. In an embodiment, the queries may require a time range for data being requested.

The leaf data aggregator 604 may also aggregate portions of the data collected from the leaf node cluster 602. Aggregation may include combining data provided from the leaf nodes of the leaf node cluster 602. The aggregation by the leaf data aggregator 604 may perform common aggregation functions. Examples of aggregation functions include counting, determining a minimum value, determining a maximum value, determining a sum of data, determining averages, determining a sum over a time interval (e.g., a minute), determining percentiles, determining histograms, etc. Aggregation may involve determining the presence of common data, including common integers, common strings, common unordered sets of strings, and common ordered vectors of strings. In some embodiments, comparisons on fields containing strings or string sets may involve the use of regular expressions for parsing. The specific aggregations performed by the leaf data aggregator 604 may depend on the parameters of the queries provided to the leaf data aggregator 604. In some embodiments, the leaf data aggregator 604 may provide the aggregated data to the intermediate data aggregator 606.

In addition to common aggregation functions, the leaf data aggregator 604 may perform specialized leaf data aggregation functions. For instance, the leaf data aggregator 604 may apply sorting or time limit constraints to data from the leaf nodes of the leaf node cluster 602. In some embodiments, the leaf data aggregator 604 may collect statistics on whether each of the leaf nodes of the leaf node cluster 602 contained the information requested by the query or how many rows of data each of the leaf nodes processed. The leaf data aggregator 604 may also collect statistics on how many rows of each of the leaf nodes satisfied the query.

In an embodiment, the intermediate data aggregator 606 may identify, in response to an instruction from the root data aggregator 608, the set of leaf data aggregators with which the intermediate data aggregator 606 is associated. Identifying the set of leaf data aggregators may involve a fan-out from the intermediate data aggregator 606. For instance, the intermediate data aggregator 606 may receive an instruction from the root data aggregator 608 to identify a number of leaf data aggregators to provide queries to. In some embodiments, the intermediate data aggregator 606 may identify five leaf data aggregators with which it is associated to optimize query and aggregation times.

The intermediate data aggregator 606 may also aggregate data received from the leaf data aggregator 604 and other leaf data aggregators. For instance, the intermediate data aggregator 606 may perform common aggregation functions on data from the leaf data aggregators under the intermediate data aggregator 606.

The root data aggregator 608 may receive queries for data stored in the leaf nodes of the in-memory data storage module 106. In an embodiment, the root data aggregator 608 may identify, in response to an instruction from the query management module 108, the set of intermediate data aggregators under the root data aggregator 608. For instance, the root data aggregator 608 may receive an instruction from the query management module 108 to identify a number of intermediate data aggregators to provide queries to. Identifying the set of intermediate data aggregators may involve creating a fan-out from the root data aggregator 608. In some embodiments, the root data aggregator 608 may identify five intermediate data aggregators with which it is associated to optimize query and aggregation times.

The root data aggregator 608 may aggregate data from the intermediate data aggregators under the root data aggregator 608. The root data aggregator 608 may perform common aggregation functions on data from the intermediate data aggregators under the root data aggregator 608. In some embodiments, the root data aggregator 608 may format aggregation functions so that queries may efficiently propagate to the intermediate data aggregators under the root data aggregator 608. For instance, the root data aggregator 608 may replace average functions in queries with a sum function and a count function. After data from the query has been received from the intermediate data aggregators under the root data aggregator 608, the root data aggregator 608 may then compute aggregations of the data from the intermediate data aggregators under the root data aggregator 608. In some embodiments, the root data aggregator 608 may compute final results, including averages and percentiles. The root data aggregator 608 may also apply final sorting and limit constraints to any query before returning the results of the query to the query management module 108. In its final sorting process, the root data aggregator 608 may also compensate for any sampling performed by the data ingestion module 104.

Figure 7:
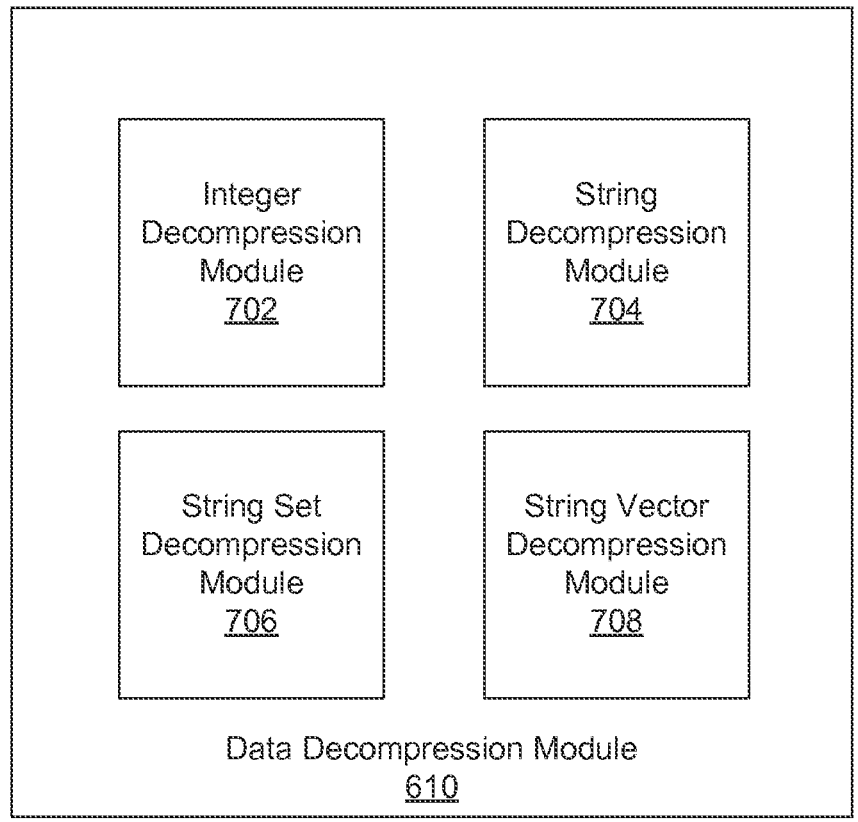
FIG. 7 shows an example of a data decompression module, in accordance with some embodiments.
Figure 8:
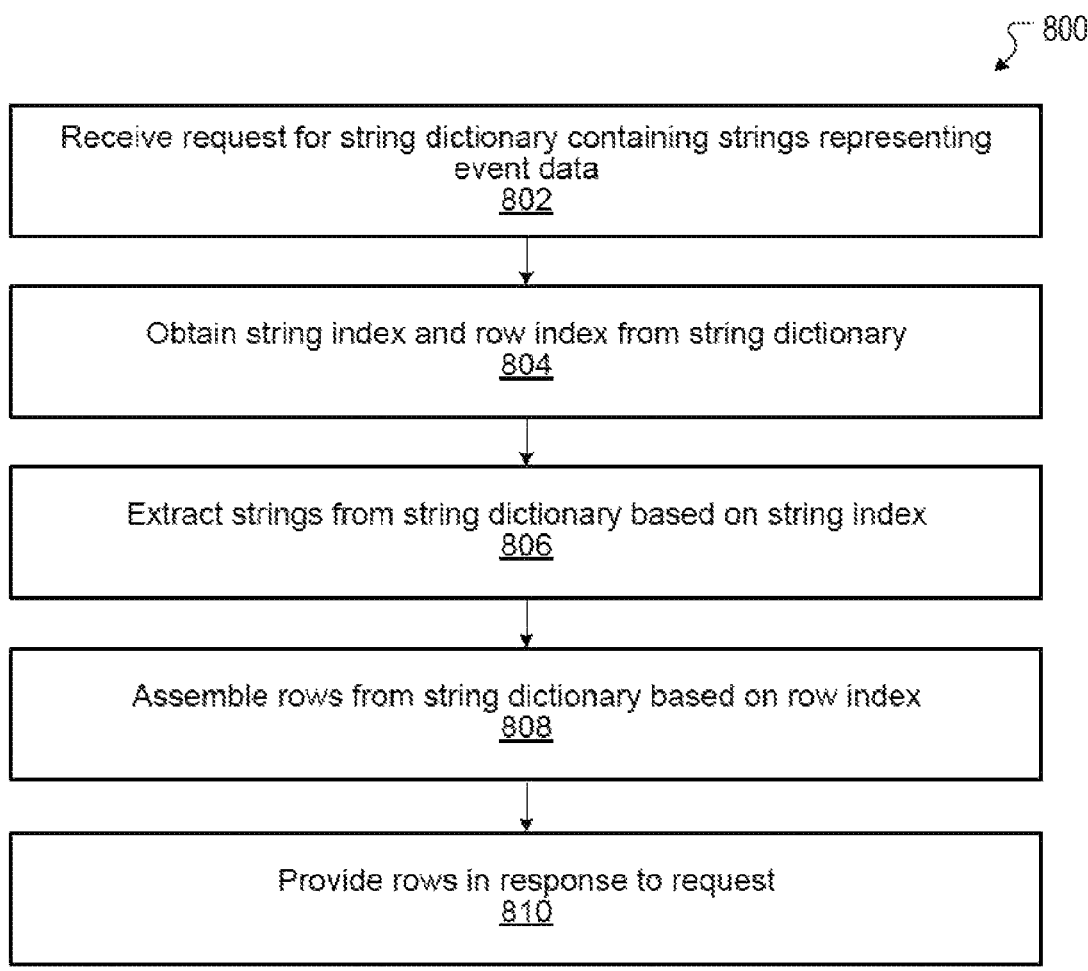
FIG. 8 shows an example of a process for decompressing strings, in accordance with some embodiments.
Figure 9:
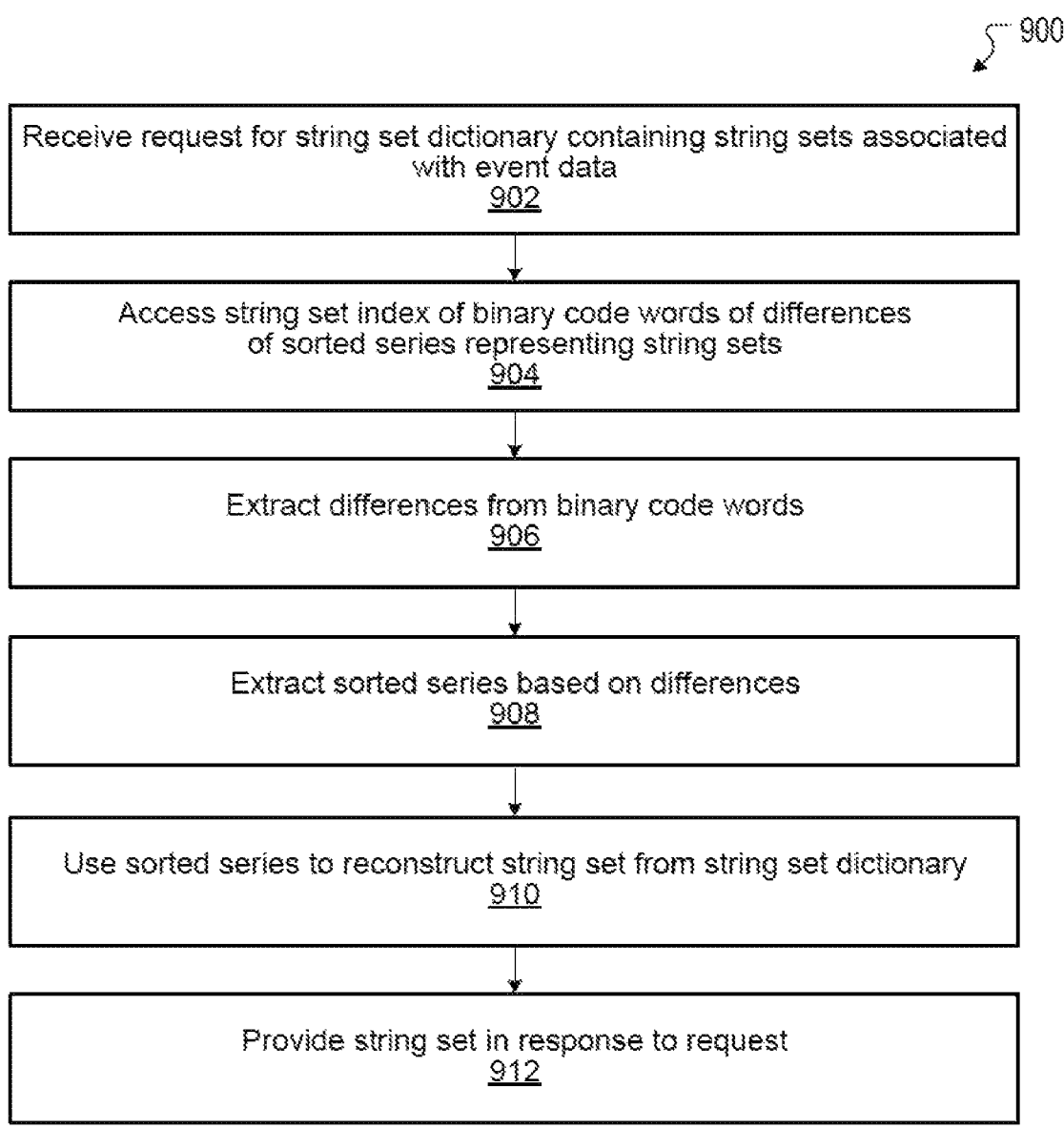
FIG. 9 shows an example of a process for decompressing string sets, in accordance with some embodiments.

In some embodiments, one or more of the leaf nodes of the leaf node cluster 602 may include a data decompression module 610. The data decompression module may decompress data in the leaf nodes. The data decompression module 610 may decompress the data using variable-length decompression techniques or dictionary decompression techniques, for instance. The decompression techniques of the data decompression module 610 may be adapted to data having the standardized data format. For example, the data decompression module 610 may decompress integer fields of data having the standardized data format using variable-length decompression techniques. The data decompression module 610 may further decompress string fields, string set fields, and string vector fields having the standardized data format using dictionary decompression techniques. FIG. 7, FIG. 8, and FIG. 9 further address the decompression techniques of the data decompression module 610.

Although FIG. 6 shows the data decompression module 610 as residing within the leaf nodes of the leaf node cluster 602, it is noted that the functionalities of the data decompression module 610 may be incorporated in other modules of the event processing system 100. For instance, the data decompression module 610 may be incorporated into the query management module 108, in various embodiments.

Though the foregoing discussion detailed operation of the leaf node cluster 602 as an example, it is noted that the in-memory data storage module 106 may include multiple leaf node clusters, as shown in FIG. 6. Further, it is also noted that the in-memory data storage module 106 may include multiple leaf data aggregators, multiple intermediate data aggregator, and multiple root data aggregators. As such, FIG. 6 shows a first hierarchical level including multiple leaf node clusters, a second hierarchical level including multiple leaf data aggregators, a third hierarchical level including multiple intermediate data aggregators, and a fourth hierarchical level including a root data aggregator. Further, the in-memory data storage module 106 may include any suitable number of hierarchical levels of aggregators.

FIG. 7 shows an example of a data decompression module 610, in accordance with some embodiments. The data decompression module 610 may include an integer decompression module 702, a string decompression module 704, a string set decompression module 706, and a string vector decompression module 708. As discussed herein, the data decompression module 610 may decompress data from leaf nodes of the in-memory data storage module 106.

The integer decompression module 702 may decompress binary code words in leaf nodes of the in-memory data storage module 106 into integer fields of event data. In various embodiments, the integer decompression module 702 may employ variable-length decompression techniques.

The string decompression module 704 may decompress string dictionaries in leaf nodes of the in-memory data storage module 106 into string fields of event data. In some embodiments, the string decompression module 704 may use a string dictionary index to reconstruct a string from a string dictionary stored in leaf nodes of the in-memory data storage module 106.

The string set decompression module 706 may decompress string set dictionaries in leaf nodes of the in-memory data storage module 106 into string set fields of event data. In some embodiments, the string set decompression module 706 may use a string set dictionary index to reconstruct a string set from a string set dictionary stored in leaf nodes of the in-memory data storage module 106. Decompression of string sets may involve decoding binary representations of string set dictionary indexes to recover differences in sorted string set elements. In an embodiment, the string set decompression module 706 may perform Fibonacci decompression of the string set dictionary indexes. The string set decompression module 706 may also reconstruct a string set in event data based on sorted string set listings that are recovered from the string set dictionaries.

The string vector decompression module 708 may decompress string vector dictionaries in leaf nodes of the in-memory data storage module 106 into string vector fields of event data. In some embodiments, the string vector decompression module 708 may use a string vector index to reconstruct a string vector from a string vector dictionary stored in leaf nodes of the in-memory data storage module 106.

FIG. 8 shows an example of a process 800 for decompressing strings, in accordance with some embodiments. The process 800 is shown in conjunction with the string decompression module 704, shown in FIG. 7.

At block 802, the string decompression module 704 may receive a request for a string dictionary containing strings that represent event data. In some embodiments, the request may come as part of a query. The request may request schema version information. In some embodiments, leaf nodes of the in-memory data storage module 106 may provide the string dictionary to the string decompression module 704.

At block 804, the string decompression module 704 may obtain the string dictionary index and the row index from the string dictionary. In some embodiments, this may involve parsing the string dictionary to recover the string dictionary index and the row index from the string dictionary. The string dictionary index may include numbers associated with particular strings. The row index may include a series of numbers reflecting how strings make up a particular row of event data.

At block 806, the string decompression module 704 may extract the strings from the string dictionary based on the string dictionary index. The string decompression module 704 may look up, based on the string dictionary index, each string that is present in the string dictionary stored in the in-memory data storage module 106.

At block 808, the string decompression module 704 may assemble the rows from the string dictionary based on the row index. In some embodiments, the string decompression module 704 may reconstruct the contents of the row of event data based on the row index.

At block 810, the string decompression module 704 may provide the rows in response to the request. In some embodiments, providing the rows may comprise providing the rows to an aggregator for aggregation of query results.

FIG. 9 shows an example of a process 900 for decompressing string sets, in accordance with some embodiments. The process 900 is shown in conjunction with the string set decompression module 706, shown in FIG. 7.

At block 902, the string set decompression module 706 may receive a request for a string set dictionary containing string sets associated with event data. In some embodiments, the request may come as part of a query. In some embodiments, leaf nodes of the in-memory data storage module 106 may provide the string set dictionary to the string set decompression module 706.

At block 904, the string set decompression module 706 may access a string set dictionary index. The string set dictionary index may comprise binary code words of differences of sorted series that represent the string sets. The binary code may represent differences of a sorted series of numbers in the string set dictionary. The sorted series may itself contain references to particular string set values stored in the string set dictionary.

At block 906, the string set decompression module 706 may extract the differences from the binary code words. In some embodiments, the string set decompression module 706 may decode the binary code words into integers. For instance, the string set decompression module 706 may use Fibonacci decoding techniques to recover integers represented by the binary code words, in some embodiments.

At block 908, the string set decompression module 706 may extract the sorted series based on the differences. The string set decompression module 706 may, based on the differences recovered from the binary code words, determine the elements of the sorted series of string set dictionary indexes that are represented in the string set dictionary.

At block 910, the string set decompression module 706 may use the sorted series to reconstruct the string set from the string set dictionary. In some embodiments, the string set decompression module 706 may look up particular string set listings of the string set dictionary based on the string set dictionary index.

At block 912, the string set decompression module 706 may provide the string set in response to the request. The string set decompression module 706 may provide the string set that was decompressed to an aggregator for aggregation of query results.

Social Networking System—Example Implementation

Figure 10:
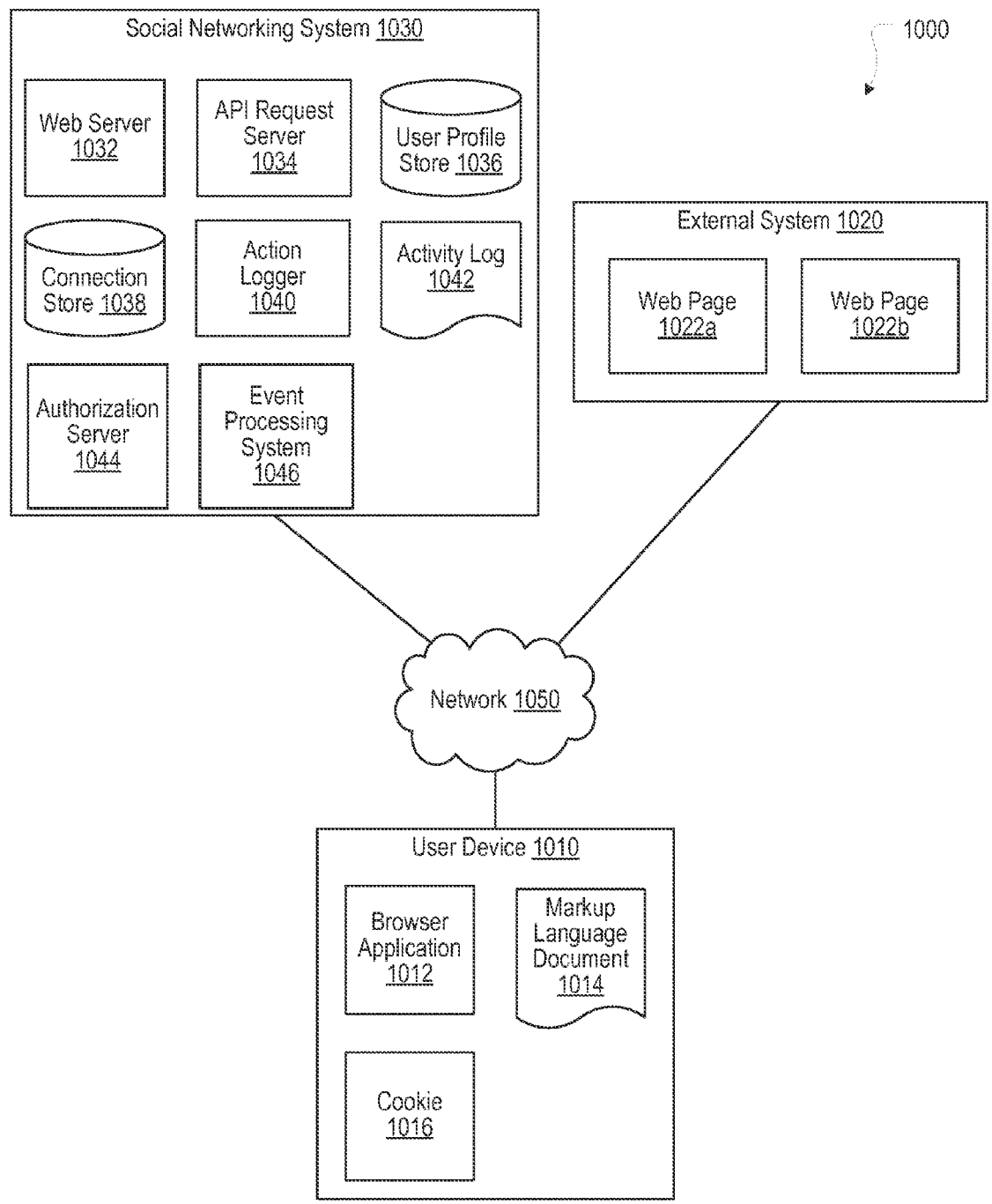
FIG. 10 shows an example of a network diagram of an event processing system within a social networking system, in accordance with some embodiments.

FIG. 10 shows a network diagram of an example social networking system 1000 in which to implement the event processing system 100, in accordance with some embodiments. The social networking system 1000 includes one or more user devices 1010, one or more external systems 1020, a social networking system 1030, and a network 1050. In an embodiment, the social networking system discussed in connection with the embodiments described above may be implemented as the social networking system 1030. For purposes of illustration, the embodiment of the social networking system 1000, shown by FIG. 10, includes a single external system 1020 and a single user device 1010. However, in other embodiments, the social networking system 1000 may include more user devices 1010 and/or more external systems 1020. In certain embodiments, the social networking system 1030 is operated by a social networking system provider, whereas the external systems 1020 are separate from the social networking system 1030 in that they may be operated by different entities. In various embodiments, however, the social networking system 1030 and the external systems 1020 operate in conjunction to provide social networking services to users (or members) of the social networking system 1030. In this sense, the social networking system 1030 provides a platform or backbone, which other systems, such as external systems 1020, may use to provide social networking services and functionalities to users across the Internet.

The user device 1010 comprises one or more computing devices that can receive input from a user and transmit and receive data via the network 1050. In one embodiment, the user device 1010 may include a conventional computer system executing, for example, a Microsoft Windows compatible operating system (OS), Apple OS X, and/or a Linux distribution. In another embodiment, the user device 1010 can be a device having computer functionality, such as a smartphone, a tablet, a personal digital assistant (PDA), a mobile telephone, etc. The user device 1010 is configured to communicate via the network 1050. The user device 1010 can execute an application, for example, a browser application that allows a user of the user device 1010 to interact with the social networking system 1030. In another embodiment, the user device 1010 interacts with the social networking system 1030 through an application programming interface (API) provided by the native operating system of the user device 1010, such as iOS and ANDROID. The user device 1010 is configured to communicate with the external system 1020 and the social networking system 1030 via the network 1050, which may comprise any combination of local area and/or wide area networks, using wired and/or wireless communication systems.

In one embodiment, the network 1050 uses standard communications technologies and protocols. Thus, the network 1050 can include links using technologies such as Ethernet, 1002.10, worldwide interoperability for microwave access (WiMAX), 3G, 4G, CDMA, GSM, LTE, digital subscriber line (DSL), etc. Similarly, the networking protocols used on the network 1050 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 1050 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 1010 may display content from the external system 1020 and/or from the social networking system 1030 by processing a markup language document 1014 received from the external system 1020 and from the social networking system 1030 using a browser application 1012. The markup language document 1014 identifies content and one or more instructions describing formatting or presentation of the content. By executing the instructions included in the markup language document 1014, the browser application 1012 displays the identified content using the format or presentation described by the markup language document 1014. For example, the markup language document 1014 includes instructions for generating and displaying a web page having multiple frames that include text and/or image data retrieved from the external system 1020 and the social networking system 1030. In various embodiments, the markup language document 1014 comprises a data file including extensible markup language (XML) data, extensible hypertext markup language (XHTML) data, or other markup language data. Additionally, the markup language document 1014 may include JavaScript Object Notation (JSON) data, JSON with padding (JSONP), and JavaScript data to facilitate data-interchange between the external system 1020 and the user device 1010. The browser application 1012 on the user device 1010 may use a JavaScript compiler to decode the markup language document 1014.

The markup language document 1014 may also include, or link to, applications or application frameworks such as FLASH™ or Unity™ applications, the SilverLight™ application framework, etc.

In one embodiment, the user device 1010 also includes one or more cookies 1016 including data indicating whether a user of the user device 1010 is logged into the social networking system 1030, which may enable modification of the data communicated from the social networking system 1030 to the user device 1010.

The external system 1020 includes one or more web servers that include one or more web pages 1022*a*, 1022*b*, which are communicated to the user device 1010 using the network 1050. The external system 1020 is separate from the social networking system 1030. For example, the external system 1020 is associated with a first domain, while the social networking system 1030 is associated with a separate social networking domain. Web pages 1022*a*, 1022*b*, included in the external system 1020, comprise markup language documents 1014 identifying content and including instructions specifying formatting or presentation of the identified content.

The social networking system 1030 includes one or more computing devices for a social networking system, including a plurality of users, and providing users of the social networking system with the ability to communicate and interact with other users of the social networking system. In some instances, the social networking system can be represented by a graph, i.e., a data structure including edges and nodes. Other data structures can also be used to represent the social networking system, including but not limited to databases, objects, classes, meta elements, files, or any other data structure. The social networking system 1030 may be administered, managed, or controlled by an administrator. The administrator of the social networking system 1030 may be a human being, an automated application, or a series of applications for managing content, regulating policies, and collecting usage metrics within the social networking system 1030. Any type of administrator may be used.

Users may join the social networking system 1030 and then add connections to any number of other users of the social networking system 1030 to whom they desire to be connected. As used herein, the term "friend" refers to any other user of the social networking system 1030 to whom a user has formed a connection, association, or relationship via the social networking system 1030. For example, in an embodiment, if users in the social networking system 1030 are represented as nodes in the social graph, the term "friend" can refer to an edge formed between and directly connecting two user nodes.

Connections may be added explicitly by a user or may be automatically created by the social networking system 1030 based on common characteristics of the users (e.g., users who are alumni of the same educational institution). For example, a first user specifically selects a particular other user to be a friend. Connections in the social networking system 1030 are usually in both directions, but need not be, so the terms "user" and "friend" depend on the frame of reference. Connections between users of the social networking system 1030 are usually bilateral ("two-way"), or "mutual," but connections may also be unilateral, or "one-way." For example, if Bob and Joe are both users of the social networking system 1030 and connected to each other, Bob and Joe are each other's connections. If, on the other hand, Bob wishes to connect to Joe to view data communicated to the social networking system 1030 by Joe, but Joe does not wish to form a mutual connection, a unilateral connection may be established. The connection between users may be a direct connection; however, some embodiments of the social networking system 1030 allow the connection to be indirect via one or more levels of connections or degrees of separation.

In addition to establishing and maintaining connections between users and allowing interactions between users, the social networking system 1030 provides users with the ability to take actions on various types of items supported by the social networking system 1030. These items may include groups or networks (i.e., social networks of people, entities, and concepts) to which users of the social networking system 1030 may belong, events or calendar entries in which a user might be interested, computer-based applications that a user may use via the social networking system 1030, transactions that allow users to buy or sell items via services provided by or through the social networking system 1030, and interactions with advertisements that a user may perform on or off the social networking system 1030. These are just a few examples of the items upon which a user may act on the social networking system 1030, and many others are possible. A user may interact with anything that is capable of being represented in the social networking system 1030 or in the external system 1020, separate from the social networking system 1030, or coupled to the social networking system 1030 via the network 1050.

The social networking system 1030 is also capable of linking a variety of entities. For example, the social networking system 1030 enables users to interact with each other as well as external systems 1020 or other entities through an API, a web service, or other communication channels. The social networking system 1030 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 1030. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 1030 modifies edges connecting the various nodes to reflect the relationships and interactions.

The social networking system 1030 also includes user-generated content, which enhances a user's interactions with the social networking system 1030. User-generated content may include anything a user can add, upload, send, or "post" to the social networking system 1030. For example, a user communicates posts to the social networking system 1030 from a user device 1010. Posts may include data such as status updates or other textual data, location information, images such as photos, videos, links, music or other similar data and/or media. Content may also be added to the social networking system 1030 by a third party. Content "items" are represented as objects in the social networking system 1030. In this way, users of the social networking system 1030 are encouraged to communicate with each other by posting text and content items of various types of media through various communication channels. Such communication increases the interaction of users with each other and increases the frequency with which users interact with the social networking system 1030.

The social networking system 1030 includes a web server 1032, an API request server 1034, a user profile store 1036, a connection store 1038, an action logger 1040, an activity log 1042, an authorization server 1044, and an event processing system 1046. In an embodiment, the social networking system 1030 may include additional, fewer, or different components for various applications. Other components, such as network interfaces, security mechanisms, load balancers, failover servers, management and network operations consoles, and the like are not shown so as to not obscure the details of the system.

The user profile store 1036 maintains information about user accounts, including biographic, demographic, and other types of descriptive information, such as work experience, educational history, hobbies or preferences, location, and the like that has been declared by users or inferred by the social networking system 1030. This information is stored in the user profile store 1036 such that each user is uniquely identified. The social networking system 1030 also stores data describing one or more connections between different users in the connection store 1038. The connection information may indicate users who have similar or common work experience, group memberships, hobbies, or educational history. Additionally, the social networking system 1030 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 1030, such as non-person entities, buckets, cluster centers, images, interests, pages, external systems, concepts, and the like are also stored in the connection store 1038.

The social networking system 1030 maintains data about objects with which a user may interact. To maintain this data, the user profile store 1036 and the connection store 1038 store instances of the corresponding type of objects maintained by the social networking system 1030. Each object type has information fields that are suitable for storing information appropriate to the type of object. For example, the user profile store 1036 contains data structures with fields suitable for describing a user's account and information related to a user's account. When a new object of a particular type is created, the social networking system 1030 initializes a new data structure of the corresponding type, assigns a unique object identifier to it, and begins to add data to the object as needed. This might occur, for example, when a user becomes a user of the social networking system 1030, the social networking system 1030 generates a new instance of a user profile in the user profile store 1036, assigns a unique identifier to the user account, and begins to populate the fields of the user account with information provided by the user.

The connection store 1038 includes data structures suitable for describing a user's connections to other users, connections to external systems 1020 or connections to other entities. The connection store 1038 may also associate a connection type with a user's connections, which may be used in conjunction with the user's privacy setting to regulate access to information about the user. In an embodiment, the user profile store 1036 and the connection store 1038 may be implemented as a federated database.

Data stored in the connection store 1038, the user profile store 1036, and the activity log 1042 enables the social networking system 1030 to generate the social graph that uses nodes to identify various objects and edges connecting nodes to identify relationships between different objects. For example, if a first user establishes a connection with a second user in the social networking system 1030, user accounts of the first user and the second user from the user profile store 1036 may act as nodes in the social graph. The connection between the first user and the second user stored by the connection store 1038 is an edge between the nodes associated with the first user and the second user. Continuing this example, the second user may then send the first user a message within the social networking system 1030. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 1030 (or, alternatively, in an image maintained by another system outside of the social networking system 1030). The image may itself be represented as a node in the social networking system 1030. This tagging action may create edges between the first user and the second user as well as create an edge between each of the users and the image, which is also a node in the social graph. In yet another example, if a user confirms attending an event, the user and the event are nodes obtained from the user profile store 1036, where the attendance of the event is an edge between the nodes that may be retrieved from the activity log 1042. By generating and maintaining the social graph, the social networking system 1030 includes data describing many different types of objects and the interactions and connections among those objects, providing a rich source of socially relevant information.

The web server 1032 links the social networking system 1030 to one or more user devices 1010 and/or one or more external systems 1020 via the network 1050. The web server 1032 serves web pages, as well as other web-related content, such as Java, JavaScript, Flash, XML, and so forth. The web server 1032 may include a mail server or other messaging functionality for receiving and routing messages between the social networking system 1030 and one or more user devices 1010. The messages can be instant messages, queued messages (e.g., email), text and SMS messages, or any other suitable messaging format.

The API request server 1034 allows one or more external systems 1020 and user devices 1010 to call access information from the social networking system 1030 by calling one or more API functions. The API request server 1034 may also allow external systems 1020 to send information to the social networking system 1030 by calling APIs. The external system 1020, in one embodiment, sends an API request to the social networking system 1030 via the network 1050, and the API request server 1034 receives the API request. The API request server 1034 processes the request by calling an API associated with the API request to generate an appropriate response, which the API request server 1034 communicates to the external system 1020 via the network 1050. For example, responsive to an API request, the API request server 1034 collects data associated with a user, such as the user's connections that have logged into the external system 1020, and communicates the collected data to the external system 1020. In another embodiment, the user device 1010 communicates with the social networking system 1030 via APIs in the same manner as external systems 1020.

The action logger 1040 is capable of receiving communications from the web server 1032 about user actions on and/or off the social networking system 1030. The action logger 1040 populates the activity log 1042 with information about user actions, enabling the social networking system 1030 to discover various actions taken by its users within the social networking system 1030 and outside of the social networking system 1030. Any action that a particular user takes with respect to another node on the social networking system 1030 may be associated with each user's account, through information maintained in the activity log 1042 or in a similar database or other data repository. Examples of actions taken by a user within the social networking system 1030 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 1030, the action is recorded in the activity log 1042. In one embodiment, the social networking system 1030 maintains the activity log 1042 as a database of entries. When an action is taken within the social networking system 1030, an entry for the action is added to the activity log 1042. The activity log 1042 may be referred to as an action log.

Additionally, user actions may be associated with concepts and actions that occur within an entity outside of the social networking system 1030, such as an external system 1020 that is separate from the social networking system 1030. For example, the action logger 1040 may receive data describing a user's interaction with an external system 1020 from the web server 1032. In this example, the external system 1020 reports a user's interaction according to structured actions and objects in the social graph.

Other examples of actions where a user interacts with an external system 1020 include a user expressing an interest in an external system 1020 or another entity, a user posting a comment to the social networking system 1030 that discusses an external system 1020 or a web page 1022a within the external system 1020, a user posting to the social networking system 1030 a Uniform Resource Locator (URL) or other identifier associated with an external system 1020, a user attending an event associated with an external system 1020, or any other action by a user that is related to an external system 1020. Thus, the activity log 1042 may include actions describing interactions between a user of the social networking system 1030 and an external system 1020 that is separate from the social networking system 1030.

The authorization server 1044 enforces one or more privacy settings of the users of the social networking system 1030. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 1020, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 1020. One embodiment allows the specification of the set of entities to comprise an enumeration of entities. For example, the user may provide a list of external systems 1020 that are allowed to access certain information. Another embodiment allows the specification to comprise a set of entities along with exceptions that are not allowed to access the information. For example, a user may allow all external systems 1020 to access the user's work information, but specify a list of external systems 1020 that are not allowed to access the work information. Certain embodiments call the list of exceptions that are not allowed to access certain information a "block list". External systems 1020 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 1044 contains logic to determine if certain information associated with a user can be accessed by a user's friends, external systems 1020, and/or other applications and entities. The external system 1020 may need authorization from the authorization server 1044 to access the user's more private and sensitive information, such as the user's work phone number. Based on the user's privacy settings, the authorization server 1044 determines if another user, the external system 1020, an application, or another entity is allowed to access information associated with the user, including information about actions taken by the user.

The social networking system 1030 may include an event processing system 1046. The event processing system 1046 may allow administrators or performance team personnel of the social networking system 1030 to monitor and analyze any aspect of the operation of the social networking system 1030. In an embodiment, the event processing system 1046 may be implemented as the event processing system 100, as discussed in more detail herein. In an embodiment, the event processing system 1046 may ingest log entries regarding events associated with the social networking system 1030 from data sources and may format the log entries for storage in leaf nodes of an in-memory data storage module. The event processing system 1046 may efficiently store log entries in a compressed format. The event processing system 1046 may also query the in-memory data storage module. A query may be provided to aggregators at various hierarchical levels and then provided to leaf nodes to obtain query results. The results may be decompressed and provided from the leaf nodes through intermediate hierarchical levels of aggregators and finally to a root data aggregator. The aggregated results may constitute query results that may be provided to a query management module.

Hardware Implementation

Figure 11:
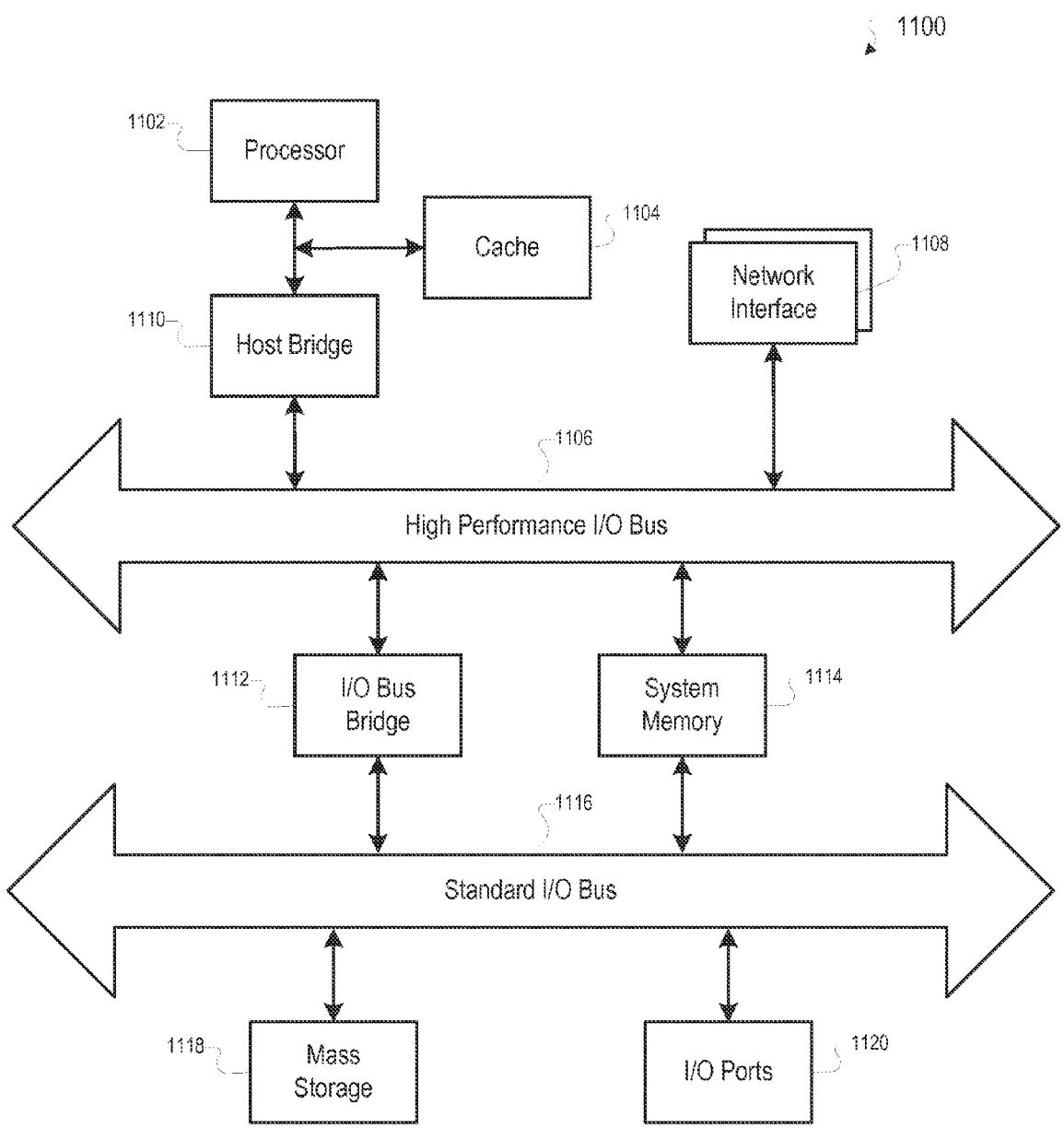
FIG. 11 shows an example of a computer system that may be used to implement one or more of the embodiments described herein in accordance with some embodiments.

The foregoing processes and features can be implemented by a wide variety of machine and computer system architectures and in a wide variety of network and computing environments. FIG. 11 illustrates an example of a computer system 1100 that may be used to implement one or more of the embodiments described herein in accordance with an embodiment. The computer system 1100 includes sets of instructions for causing the computer system 1100 to perform the processes and features discussed herein. The computer system 1100 may be connected (e.g., networked) to other machines. In a networked deployment, the computer system 1100 may operate in the capacity of a server machine or a client machine in a client-server network environment, or as a peer machine in a peer-to-peer (or distributed) network environment. In an embodiment, the computer system 1100 may be the social networking system 1130, the user device 1110, and the external system 1110, or a component thereof. In an embodiment, the computer system 1100 may be one server among many that constitutes all or part of the social networking system 1130.

The computer system 1100 includes a processor 1102, a cache 1104, and one or more executable modules and drivers, stored on a computer-readable medium, directed to the processes and features described herein. Additionally, the computer system 1100 includes a high performance input/output (I/O) bus 1106 and a standard I/O bus 1108. A host bridge 1110 couples processor 1102 to high performance I/O bus 1106, whereas I/O bus bridge 1112 couples the two buses 1106 and 1108 to each other. A system memory 1114 and a network interface 1116 couple to high performance I/O bus 1106. The computer system 1100 may further include video memory and a display device coupled to the video memory (not shown). Mass storage 1118 and I/O ports 1120 couple to the standard I/O bus 1108. The computer system 1100 may optionally include a keyboard and pointing device, a display device, or other input/output devices (not shown) coupled to the standard I/O bus 1108. Collectively, these elements are intended to represent a broad category of computer hardware systems, including but not limited to computer systems based on the x116-compatible processors manufactured by Intel Corporation of Santa Clara, Calif., and the x116-compatible processors manufactured by Advanced Micro Devices (AMD), Inc., of Sunnyvale, Calif., as well as any other suitable processor.

An operating system manages and controls the operation of the computer system 1100, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1100 are described in greater detail below. In particular, the network interface 1116 provides communication between the computer system 1100 and any of a wide range of networks, such as an Ethernet (e.g., IEEE 802.3) network, a backplane, etc. The mass storage 1118 provides permanent storage for the data and programming instructions to perform the above-described processes and features implemented by the respective computing systems identified above, whereas the system memory 1114 (e.g., DRAM) provides temporary storage for the data and programming instructions when executed by the processor 1102. The I/O ports 1120 may be one or more serial and/or parallel communication ports that provide communication between additional peripheral devices, which may be coupled to the computer system 1100.

The computer system 1100 may include a variety of system architectures, and various components of the computer system 1100 may be rearranged. For example, the cache 1104 may be on-chip with processor 1102. Alternatively, the cache 1104 and the processor 1102 may be packed together as a "processor module", with processor 1102 being referred to as the "processor core". Furthermore, certain embodiments may neither require nor include all of the above components. For example, peripheral devices coupled to the standard I/O bus 1108 may couple to the high performance I/O bus 1106. In addition, in some embodiments, only a single bus may exist, with the components of the computer system 1100 being coupled to the single bus. Furthermore, the computer system 1100 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1100 that, when read and executed by one or more processors, cause the computer system 1100 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1100, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1102. Initially, the series of instructions may be stored on a storage device, such as the mass storage 1118. However, the series of instructions can be stored on any suitable computer readable storage medium. Furthermore, the series of instructions need not be stored locally, and could be received from a remote storage device, such as a server on a network, via the network interface 1116. The instructions are copied from the storage device, such as the mass storage 1118, into the system memory 1114 and then accessed and executed by the processor 1102. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1100 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "other embodiments", "another embodiment", "various embodiments", "certain embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed:

1. A system comprising:
   at least one processor; and
   a memory storing instructions configured to instruct the at least one processor to perform:
   receiving event data comprising an unordered string set;
   assigning string set dictionary indexes for strings of the unordered string set in a string set dictionary;
   sorting the unordered string set to provide a sorted series based on the string set dictionary indexes for the unordered string set;
   computing a differential series from the sorted series; and
   encoding the differential series into binary code words.

2. The system of claim 1, wherein the instructions are configured to instruct the at least one processor to perform storing the binary code words to a leaf node of an in-memory data storage module.

3. The system of claim 2, wherein the instructions are configured to instruct the at least one processor to perform storing the string set dictionary to the leaf node.

4. The system of claim 2, wherein the instructions are configured to instruct the at least one processor to perform decompressing the binary code words.

5. The system of claim 1, wherein the sorted series comprises an ascending series.

6. The system of claim 1, wherein the binary code words comprise Fibonacci code words representing the differential series.

7. The system of claim 1, wherein the unordered string set is associated with user experiment group information or error report information for a social networking system.

8. The system of claim 1, wherein the unordered string set is part of a row being ingested into a portion of an in-memory data storage module.

9. The system of claim 8, wherein the portion comprises a leaf node or an aggregator of the in-memory data storage module.

10. The system of claim 1, wherein the event data comprises strings, and the instructions are configured to instruct the at least one processor to perform:
    determining a schema version for a row index associated with the strings; and
    allocating resources based on the schema version.

11. The system of claim 10, wherein the strings are organized by columns.

12. The system of claim 11, wherein a string dictionary is associated with each column.

13. The system of claim 12, wherein a string dictionary index is assigned to a unique string in a column.

14. The system of claim 13, wherein the instructions are configured to instruct the at least one processor to perform writing the string dictionary to a leaf node of an in-memory data storage module.

15. The system of claim 10, wherein the determining the schema version comprises:
   creating the row index based on string dictionary indexes for the strings in a row; and
   assigning the schema version based on the row index.

16. The system of claim 15, wherein the creating the row index comprises:
   creating a string dictionary index for each unique string; and
   assigning the row index based on the string dictionary index for each unique string.

17. The system of claim 1, wherein the event data corresponds to one or more of a performance event on a computing system, user interaction with the computing system, or a behavioral event on the computing system.

18. The system of claim 1, wherein the system is incorporated into a social networking system.

19. A computer implemented method comprising:
   receiving, by a computer system, event data containing an unordered string set;
   assigning, by the computer system, string set dictionary indexes for strings of the unordered string set in a string set dictionary;
   sorting, by the computer system, the unordered string set to provide a sorted series based on the string set dictionary indexes for the unordered string set;
   computing, by the computer system, a differential series from the sorted series; and
   encoding, by the computer system, the differential series into binary code words.

20. A non-transitory computer storage medium storing computer-executable instructions that, when executed by a processor, cause a computer system to perform a computer-implemented method comprising:
   receiving event data comprising an unordered string set;
   assigning string set dictionary indexes for strings of the unordered string set in a string set dictionary;
   sorting the unordered string set to provide a sorted series based on the string set dictionary indexes for the unordered string set;
   computing a differential series from the sorted series; and
   encoding the differential series into binary code words.

* * * * *